J. HERMAN.
AGRICULTURAL IMPLEMENT.
APPLICATION FILED MAY 20, 1909.
957,675.
Patented May 10, 1910.
3 SHEETS—SHEET 3.
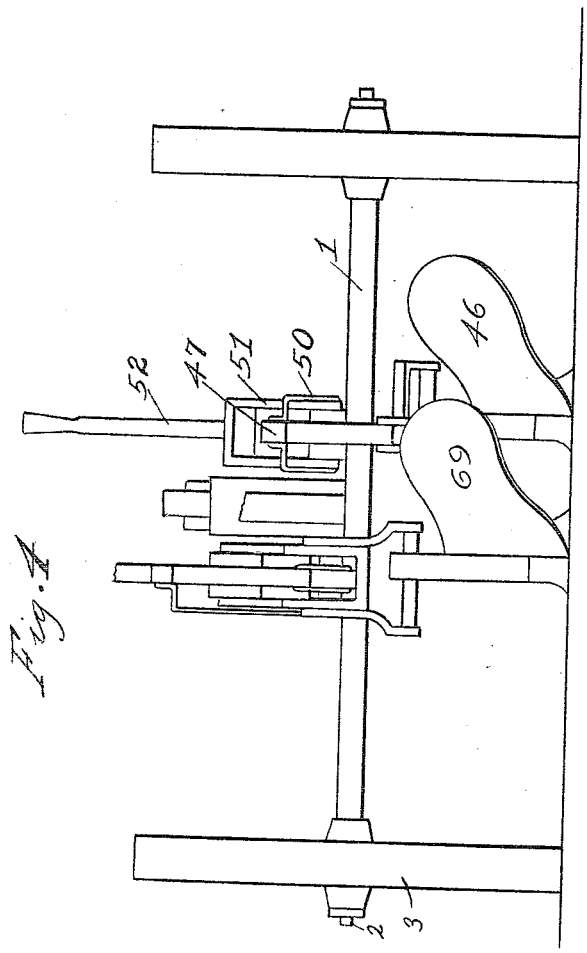
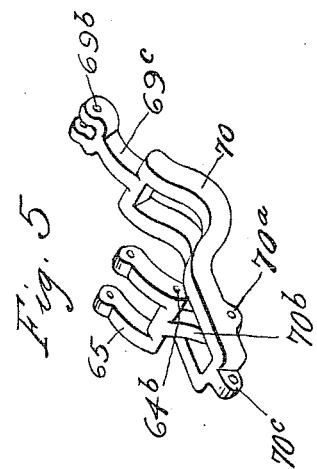

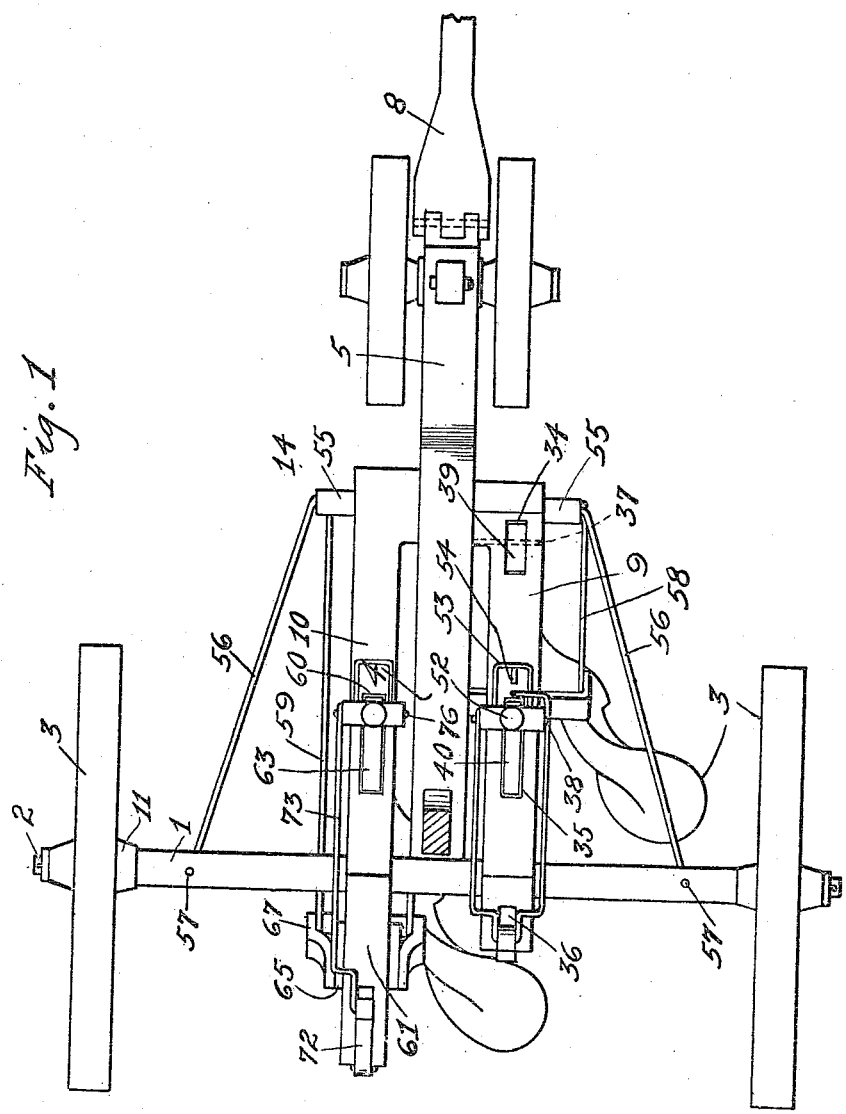

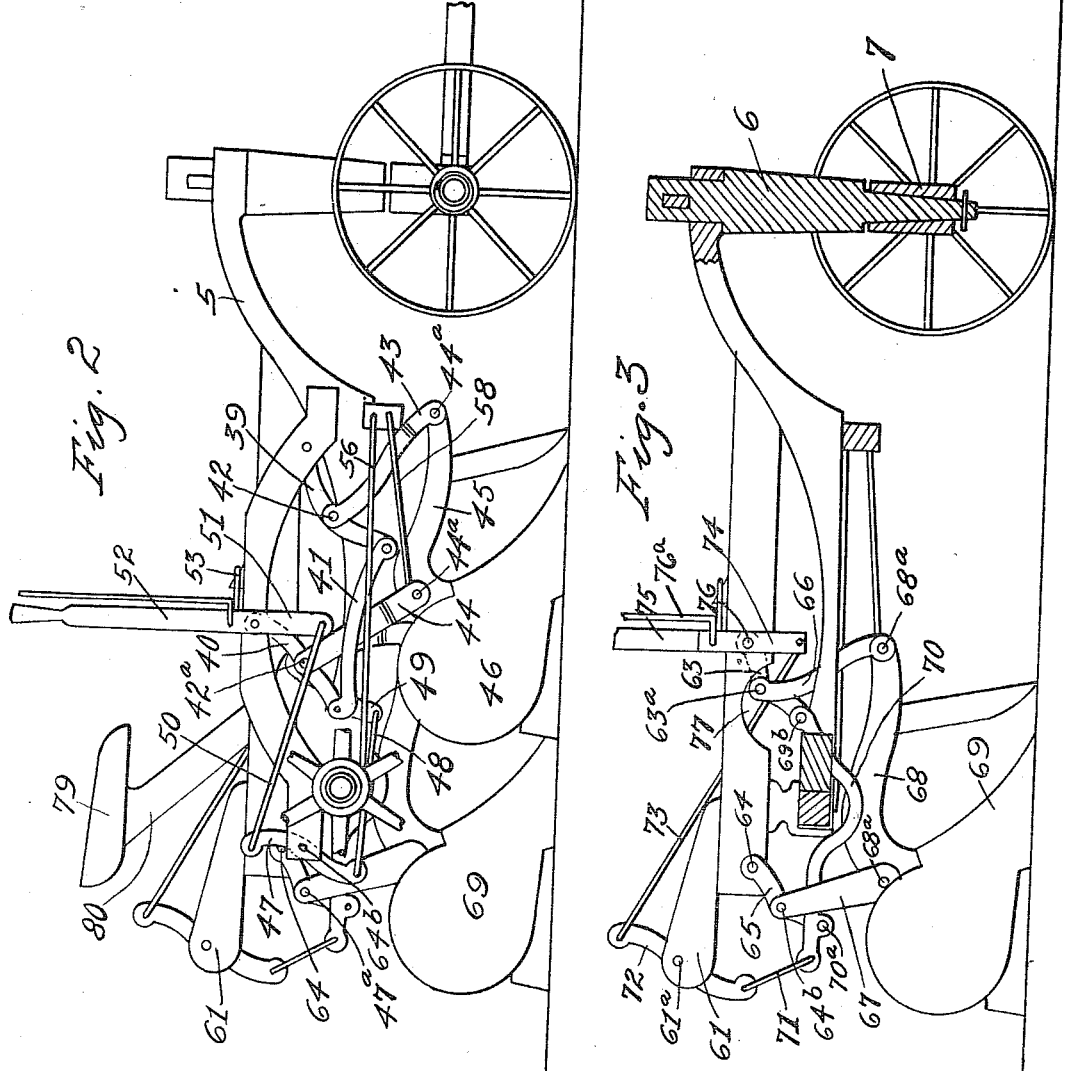

UNITED STATES PATENT OFFICE.

JACOB HERMAN, OF BRADDOCK, PENNSYLVANIA.

AGRICULTURAL IMPLEMENT.

957,675.  Specification of Letters Patent.  Patented May 10, 1910.

Application filed May 20, 1909. Serial No. 497,312.

*To all whom it may concern:*

Be it known that I, JACOB HERMAN, a citizen of the United States of America, residing at Braddock, in the county of Allegheny and State of Pennsylvania, have invented certain new and useful Improvements in Agricultural Implements, of which the following is a specification, reference being had therein to the accompanying drawing.

This invention relates to agricultural implements of that class which may be termed a double plow and the object thereof is to provide an agricultural implement in the manner as hereinafter set forth and claimed embodying a pair of plow points, each of which is independently adjustable of the other when occasion so requires.

A further object of the invention is to provide in a manner as hereinafter set forth an agricultural implement which will be strong and durable as well as saving considerable time, labor, and expense, in tilling the soil, particularly of large farms and ranches.

With the foregoing and other objects the invention consists of the novel construction, combination, and arrangement of parts as hereinafter more specifically described and illustrated in the accompanying drawing, wherein is shown the preferred embodiment of the invention, but it is to be understood that changes, variations and modifications can be resorted to which come within the scope of the claims hereunto appended.

In the drawings: Figure 1 is a plan partly in section of an agricultural implement in accordance with this invention, Fig. 2 is a side elevation of the implement, the walls being broken away, Fig. 3 is a sectional side elevation, Fig. 4 is a rear elevation, and Fig. 5 is a detail in perspective illustrating a hanger and a yoke forming the elements of one of the plow elevating mechanisms.

Referring to the drawings in detail, 1 denotes an axle provided with spindles 2 on which are mounted wheels 3.

4 denotes a beam which projects forwardly from the axle 1 and which has its outer end bent upwardly and forwardly as at 5 to a position in a plane above that of the axle 1.

Connected to the outer or forward end of the beam 4 is a depending post 6 constituting what may be termed a king-bolt for a narrow gage truck 7 provided with a pivoted tongue 8 to which the motive or horse power is attached to move the implement over the soil to be tilled.

At each side of the beam 4 is arranged a longitudinally-extending supporting member, one of the supports being indicated by the reference character 9 and the other by the reference character 10. The support 9 at its forward end is secured to one side of the beam 4 and at its rear end to the axle 1. The support 10 is secured at its forward end to the side of the beam 4 and projects rearwardly over the axle 1 as well as being secured to said axle. The support 9 is substantially arch-shaped whereby the central portion of said support 9 will be arranged in a plane above the beam 4. The support 10 extends in a longitudinal plane which is substantially in parallelism with respect to the central portion of the support 9.

The support 9 is provided with a series of vertically-disposed slots which are indicated as at 34, 35, and 36. Extending into the slot 34 is the upper end of a hanger 39, the said upper end being pivotally-connected to the support 9 by the pin 37 which extends through the said upper end. Projecting into the slot 35 is the upper end of a hanger 40, the said upper end being pivotally-connected to the support 9 by a pin 38 which extends through the said end. The lower ends of the hangers 39 and 40 are connected together by a tie rod 41. Pivotally-connected to the hanger 39 intermediate its ends as at 42 is a suspension arm 43 and pivotally-connected to the hanger 40 intermediate its ends as at 42ª is a suspension arm 44. The lower ends of the suspension arms 43 and 44 are pivotally-connected as at 44ª to plow beam 45 from which depends the forward plow 46. Owing to the foregoing arrangement the plow beam 45 is suspended in such manner that it can be shifted to elevate or lower the plow 46. The means for shifting the plow beam 45 consists of a lever 47 extending through the slot 36 of the support 9 and mounted upon the pivot 47ª. The lower end of the lever 47 is connected by a rod 48 to a depending extension 49 of the hanger 40.

The reference character 52 denotes an operating lever which has the lower bifurcated end 51 straddling the support 9. The bifurcated end 51 of the lever 52 is fulcrumed upon the pivot 38 of the hanger 40 and is connected by a stirrup 50 to the upper end of the lever 47. The operating lever 52 is provided with a gravity latch 53 adapted to engage the keeper 54 upon the support 9 whereby the operating lever 52 can be held in position to maintain the beam 45 in its adjusted position. If the upper end of the lever 52 is swung rearwardly the hangers 39 and 40 will be carried therewith, which in turn will move the suspension arms 44 and 43 rearwardly elevating the beam 45, the latter carrying the plow 46 therewith. If the lever 52 is swung in the opposite direction the plow will be moved toward the soil or deeper into the soil.

Secured to the under side of the beam 4 is a transversely-extending brace 55, to each end of which is attached the forward end of a tie rod 56, each of said tie rods being angularly-disposed with respect to the beam 4 and has its rear end connected to the axle 1 as at 57. Pivotally-mounted in the brace 55 is a rearwardly extending yoke, one arm being indicated at 58 and the other as at 59, the arm 58 being shorter than the arm 59 and is pivotally-connected to the lower end of the suspension arm 44. The arm 59 of the yoke will be hereinafter referred to.

The support 10 is formed with a slot 60 intermediate its ends and is provided at its rear end with an overhanging bifurcated extension 61. Extending into the slot 60 is the upper end of a hanger 63, the said upper end of the hanger 63 being pivotally-connected to the support 10 by a pin 76. Straddling the rear end of the support 10 is a hanger 65 and extending through the hanger 65 and support 10 is a pin 64 whereby the hanger is pivotally-connected in position. Pivotally-connected to the hanger 63 intermediate its ends as at 63$^a$ is a suspension arm 66 and pivotally-connected to the hanger 65 as at 64$^b$ is a suspension arm 67. The lower ends of the arms 66 and 67 are pivotally-connected to the plow beam 68 as at 68$^a$. The plow beam 68 supports the rear plow 69. The arm 59 of the yoke which is carried by the brace 55 is connected to the suspension arm 67. The support 10 is cut away as at 77 to provide a clearance for the operation of the suspension arm 66 and hanger 63.

Pivotally-connected to the lower end of the hanger 63 as at 69$^b$ is an extension 69$^c$ which projects from the forward end of a yoke 70. The yoke 70 straddles the beam 68 and is pivotally-connected at a point removed from its rear end as at 70$^a$ to the lower end of an extension 70$^b$ which depends from the hanger 65. The rear end of the yoke 70 is provided with an apertured lug 70$^c$ to which is attached the lower end of a link 71.

Pivotally-mounted in the bifurcated extension 61 as at 61$^a$ is a lever 72, the lower end of which is secured to the upper end of the link 71. Attached to the upper end of the lever 72 is the rear end of a rod 73 the forward end of said rod being secured to the bifurcated lower end 74 of an operating lever 75. The bifurcated lower end 74 of the lever 75 straddles the support 10 and is pivoted upon the pin 76. The operating lever 75 is provided with a locking mechanism similar to the operating lever 52 as at 76$^a$. If the lever 75 is swung rearwardly the beam 68 will be elevated carrying the plow 69 therewith, if moved forwardly the plow 69 will be shifted toward the soil or will be caused to penetrate deeper into the soil.

Mounted upon the beam 4 is an angularly-disposed seat post 80 provided with a seat 79.

What I claim is:

1. An agricultural implement comprising a portable supporting means, two sets of hangers pivoted to said means, a pair of plows, suspension arms for connecting one of the plows to one set of hangers, suspension arms for connecting the other of the plows to the other set of hangers, a pair of levers, means for connecting one of said levers to a hanger of one set, means for connecting the other of said levers to the hanger of another set, and operating levers pivoted upon said portable supporting means and operatively connected with said pairs of levers and adapted when operated to elevate and lower the plows.

2. An agricultural implement comprising a portable supporting means, a pair of plows, a shiftable suspension means connecting one of said plows with said supporting means, a shiftable suspension means connecting the other of said plows with said supporting means, a pair of levers pivoted upon said supporting means, means for connecting one of said levers to one of said suspension means, means for connecting the other of said levers to the other of said suspension means, a pair of operating levers, and means for connecting said operating levers to the first-mentioned levers.

3. An agricultural implement comprising a portable supporting means, a pair of plow beams, a plow carried by each of said beams, a shiftable suspension means connecting one of said beams with said supporting means, a shiftable suspension means connecting the other of said beams with said supporting means, a lever and link mechanism carried by said supporting means and connected to the other of the suspension means, a lever pivoted upon said supporting means and connected to one of said lever and link mechanisms for operating it, and a lever pivoted upon said supporting means and connected to the other of said lever and link mechanisms for operating it.

4. An agricultural implement comprising a pair of supporting members, portable supporting means for said members, a forward and a rear plow, a beam projecting forwardly from each of said plows, a suspension means pivotally connecting one of said beams with one of said members, a suspension means pivotally-connecting the other of said beams with the other of said members, a lever and link mechanism carried by one of said members and connected to a suspension means, operating means for said lever and link mechanisms, a lever and link mechanism carried by the other of said members and connected to the other of said suspension means, and an operating means for said last-mentioned lever and link mechanism.

5. An agricultural implement comprising a pair of supporting members, a portable supporting means therefor, a lever supported by the rear of each of said members, a lever pivotally-connected to each of said members intermediate its ends thereof, connections between the levers of each of the members, a pivoted suspension means depending from each of said members, and connection between the lever at the rear of a member and its respective suspension means, and a plow connected to each suspension means.

6. An agricultural implement comprising a pair of supporting members, portable supporting means therefor, an actuating lever pivoted to each of said members, an operating lever pivoted to each of said members and connected to an actuating lever, hangers pivotally-connected to and depending from each of said members, a connection between one of the hangers and an actuating lever, means for connecting the hangers which depend from each member together, a pair of plows, and suspension arms between the hangers of each member and the plow.

7. An agricultural implement comprising a pair of supporting members, portable supporting means therefor, an actuating lever pivoted to each of said members, a pair of plows, suspension means connected to each of said plows and to a member, connections between one end of an actuating lever and a suspension means, an operating lever pivoted to a member, connections between an actuating lever and an operating lever, and means for maintaining the operating lever from movement after being shifted.

In testimony whereof I affix my signature in the presence of two witnesses.

JACOB HERMAN.

Witnesses:
HENRY WELLS,
JAS. V. MCMASTERS.